United States Patent [19]

Kelch et al.

[11] 3,997,903

[45] Dec. 14, 1976

[54] ELECTROGRAPHICAL RECORDING SYSTEM

[75] Inventors: Heinz Kelch, Buchenberg; Eduard Schuh, Villingen-Schwenningen, both of Germany

[73] Assignee: Kienzle Apparate GmbH, Villingen, Germany

[22] Filed: Dec. 5, 1975

[21] Appl. No.: 638,170

[30] Foreign Application Priority Data

Dec. 6, 1974 Germany .......................... 2457741

[52] U.S. Cl. ............................ 346/139 R; 346/163; 346/139 C

[51] Int. Cl.$^2$ ......................................... G01D 15/06

[58] Field of Search ......... 346/139 R, 139 C, 74 E, 346/74 S, 74 SB, 74 SC

[56] References Cited

UNITED STATES PATENTS

| | | | |
|---|---|---|---|
| 2,867,491 | 1/1959 | Nelson | 346/139 C X |
| 3,644,931 | 2/1972 | Stringer et al. | 346/74 E |
| 3,781,904 | 12/1973 | Firnig et al. | 346/74 SB |

*Primary Examiner*—Joseph W. Hartary
*Attorney, Agent, or Firm*—Michael J. Striker

[57] ABSTRACT

The recording system has a plurality of recording elements pivotally mounted to make marks in a direction substantially perpendicular to the direction of transport of the record carrier receiving the marks. Each recording element has a rigid electrically conductive L-shaped supporting member and an electrode mounted on the supporting member. The supporting members are mounted in recesses in a base of an electrically insulating structure. Specifically one leg of each supporting member has two supporting edges separated by a recess. The two edges are accommodated in corresponding openings in the base. An eccentric drives a drive arm having a plurality of plugs. A spring keeps the supporting member of each recording element in contact with the corresponding plug throughout the pivoting of the recording element.

15 Claims, 6 Drawing Figures

FIG. 4
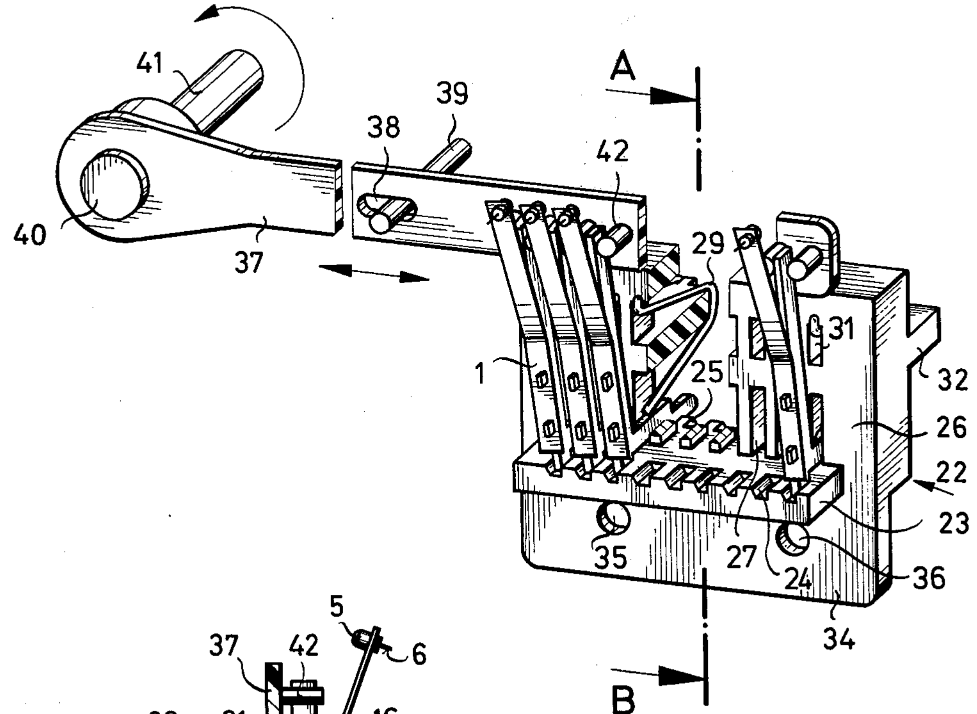
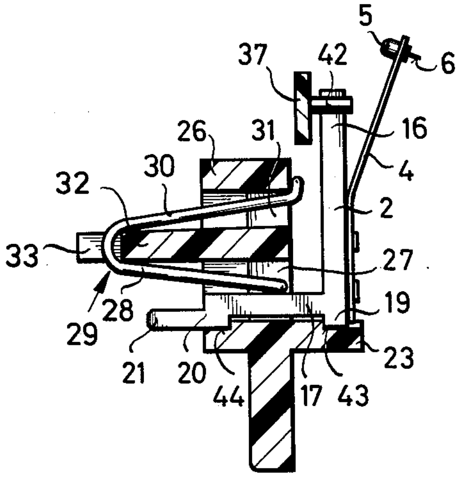
FIG. 5

ELECTROGRAPHICAL RECORDING SYSTEM

BACKGROUND OF THE INVENTION

The present invention relates to recording systems wherein a plurality of recording elements are arranged side-by-side and are adapted to register markings or marks on a record carrier in a direction perpendicular to the direction of transport of said record carrier.

In particular, the present invention relates to recording arrangements which are to provide machine readable numerical or alphabetical data. Depending upon the type of record carrier utilized, the plurality of recording elements record in parallel or concentric tracks in a bit-parallel, character-serial representation. Independent of whether the concentric or parallel tracks are used, the markings made by the recording elements are lines perpendicular to the direction of transport of the record carrier. This type of representation allows an optimum density on the record carrier and therefore is a particularly efficient utilization thereof. When markings perpendicular to the direction of transport of the record carrier are utilized, if it is assumed that these markings have a sufficient length, the necessary tolerances in the position of the individual tracks do not result in an error upon machine reading of the markings.

If for the above-described recording systems the additional requirement is made that the recording should take place at the highest possible speed and that it should be possible to have a visual control whether and how the markings have been recorded on the record carrier, then a recording process can be utilized in which the record carrier is affected by electrical current. Specifically, the record carrier may have a surface which can be burnt by such electric current.

Recording systems utilizing metallic papers (as in the above-described metal paper type of recording system) form the basis for a relatively high recording speed relative to comparable mechanical recording systems. In such metallic paper recording systems the recording is controlled directly by means of the current flow between the record carrier and the recording element. In order to utilize the characteristics of this type of metallic paper recording system to the fullest extent, it is necessary that the transport means which move the record carrier move said record carrier at a constant controllable speed and that further the movement of large masses is avoided insofar as the electrode movement is concerned. In a known arrangement of this type, the recording elements comprise a plurality of stationary electrodes, one for each of the recording tracks, the width of the electrodes corresponding to the length of the marking which is to be made on the record carrier. It is true that this type of recording system allows a relatively high recording speed and that the wear of the electrodes relative to other known systems wherein the electrodes are moved in a direction perpendicular to the direction of transport of the record carrier is relatively low. However, the burning leaves residues which, after a time, accumulate in the Vee-shaped space between the record carrier and the recording electrode. These residues tend to be imbedded into the surface of the record carrier, since this is a somewhat rough surface, and therefore cause the quality of the recording to be decreased. Thus the system is not usable for a recording system where relatively narrow marks are to be made in order that a maximum number of markings can be accommodated.

It has been suggested that these residues due to burning can be minimized if the electrodes are driven at a fairly high frequency. This requires a great deal of equipment, especially since recording systems of this type need a very high initial current. This high initial current, whose required amplitude depends upon the size of the contact surfaces between the electrode and the record carrier, results in requirements for a specially shaped surface of the electrode receiving the current after passing through the record carrier. The latter of course should itself not cause the record carrier to burn. The requirement therefore results that the current density for the initial current must be such that it is definitely below the burning threshold for the record carrier. This causes a great many difficulties in the construction of the receiving electrode.

For the above reasons it is usually desirable to sacrifice the recording speed and to utilize pointed sharp electrodes and to make the marks with these electrodes by moving said electrodes perpendicular to the direction of transport of the record carrier. This is a particularly preferred arrangement because the recording takes place without the above-mentioned residues due to the steaming of the metal layer and thus results in a high contrast recording which of course is particularly desirable for machine reading. Thus, for such movable electrodes in spite of a high-current density at the electrodes, the shape of the receiving electrode is not as critical.

In the above-described system, usually only a single recording electrode is utilized. However, the speed of such arrangements is relatively low and the electrode is subject to a relatively high degree of wear. Further, the problem of electrical connections due to flexible lines or wiper contacts arises. Further, moving the mass of the carriage carrying the electrode results in decrease in the recording speed, as does the relatively large distance through which the carriage must be moved so that the single electrode can record all the markings.

A still further known recording arrangement is disclosed in the German Dt-OS No. 2,303,321. In this recording system a plurality of wire electrodes are utilized which, in the vicinity of the end portions which do the recording are inserted into slots of a comb-like driving means and are deflected by this driving means in order to make the mark. The other end of the electrode is soldered or pressed to a contact element which is stationary. An additional comb-like supporting means is supplied which supports the electrodes in the direction opposite the direction in which the recording takes place and thus causes the connection between the electrode and the corresponding contact element to be maintained during the recording movement.

This type of system is advantageous as far as the masses to be moved and the required equipment are concerned. However, it has various characteristics which causes the recording quality to be decreased and therefore decreases its commercial value. Furthermore, the manufacture and the mounting of the electrodes which are made from a single piece of wire can only be accomplished with relatively high tolerances so that not only are there positional differences between the individual electrodes but also the elastic qualities of each of the electrodes may differ from that of the others. These cannot be equalized to a sufficient degree. For this reason the individual electrodes are generally not interchangeable. Further, these known arrangements have an additional drawback which becomes apparent when the electrodes are moved. It is known that metallic paper recording systems require a good spring characteristic of the recording elements in the direction perpendicular to the recording surface so that the burning process is not interrupted because of the great roughness of the record carrier. In the known system, the electrodes are somewhat deformed during the recording movement. With increasing deflection, additional friction results between the driving member and the holder. The elasticity of the electrodes in the direction perpendicular to the record carrier is thus decreased considerably. The effect is further increased by the fact that the electrodes tend to deform because of play in the guide slots of the driving means. Because of this unfavorable friction effect, the recording conditions do not remain constant and the recording does not take place with sufficient reliability and quality.

SUMMARY OF THE INVENTION

It is an object of the present invention to overcome the above-described disadvantages of the known systems. Further, the recording elements are to be formed in such a manner that they can be manufactured to exact tolerances, will be interchangeable in the recording system without additional adjustment, and that a high degree of reproducability in their manufacture is attained.

The present invention comprises a recording system having a record carrier and transport means for transporting said record carrier along a predetermined path. It comprises a plurality of recording elements arranged along said predetermined path for making markings on said record carrier, each of said recording elements comprising an electrically conductive rigid supporting member, an electrode, and means for spring mounting said electrode on said supporting member. The invention further comprises electrically insulating mounting means for receiving said plurality of recording elements. In the present invention, each of said supporting members has pivoting means for pivotally mounting said member in said mounting means in such a manner that said member will pivot about a pivot axis. Connecting means are furnished on a portion of said supporting member extending in the direction of said pivot axis. Oscillating drive means are furnished and means for coupling said oscillating drive means to said supporting members for pivoting said supporting members about said pivot axis.

In a preferred embodiment of the present invention the supporting member is a flat stamped part which has a first and second leg arranged substantially perpendicular to each other. The second leg carries the electrode and the drive means act on said second leg. The first leg has a first and second lower bearing edge separated by a recess. The bearing edges are received by recesses in said mounting means and, specifically, at the bottom edge of said recesses. The contact between the bearing edges and the bottom portion of the recess is maintained by means of a spring.

In a preferred embodiment of the present invention the mounting means have pairs of recesses, each pair for receiving the two above-mentioned edges of said supporting member. Specifically, in a preferred embodiment of the present invention one recess of each pair is spaced from the other in such a manner that no play of said supporting member in the direction of said pivot axis is possible. In a further preferred embodiment of the present invention the recesses are of a substantially trapezoidal form.

In a further preferred embodiment of the present invention the recesses are part of the base portion of the mounting means. Further, the mounting means comprise a wall portion substantially perpendicular to said base portion. The wall portion has through-openings, each for receiving the fist leg of one of said supporting members. The leg of the supporting member extends through said through opening the width of said opening being sufficient to allow the pivoting of the supporting member. A spring extends into said through opening and acts to exert a pivoting moment on said supporting member about said pivot axis in all pivoting positions of said supporting member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a perspective view of the arrangement of the individual recording elements in the recording system of this invention;

FIG. 5 is a sectional view of the recording arrangement of FIG. 4; and

DESCRIPTION OF THE PREFERRED EMBODIMENTS

Figure 1:
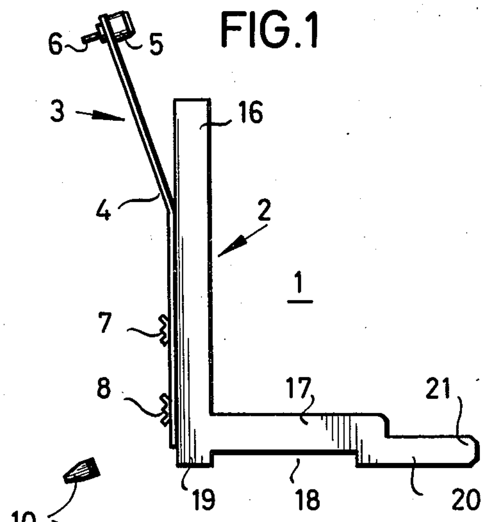
FIGS. 1, 2 and 3 show, respectively, a first, second and third embodiment of the recording elements of the present invention.

A preferred embodiment of the present invention will now be described with reference to the drawing.

Figure 2:
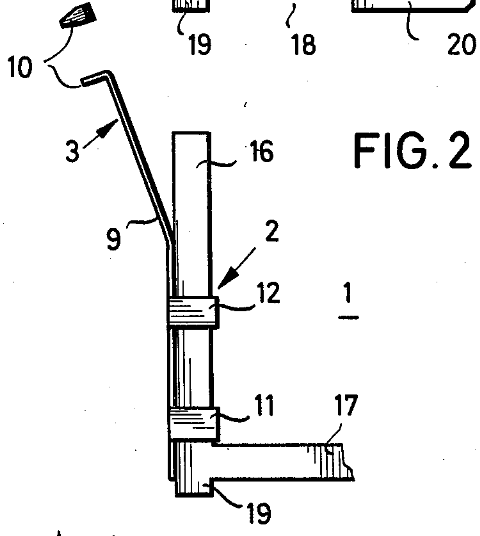
Figure 3:
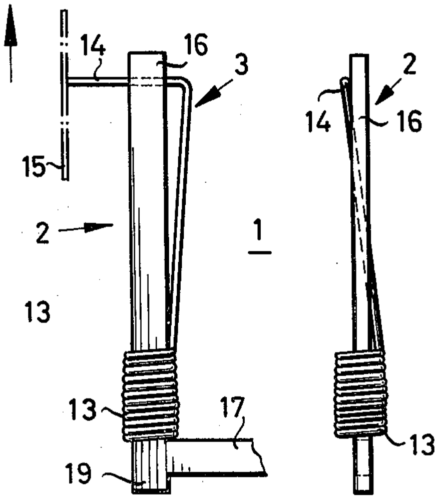

As shown in FIGS. 1, 2 and 3, each recording element 1 comprises a supporting member 2 and an electrode 3. In FIG. 1, the electrode comprises a stylus 6, which is fastened to a flat spring 4 by means of a clamping element 5. In a preferred embodiment, the stylus 6 is made of tungsten wire. The clamping element 5 is riveted to spring 4. Spring 4, as shown in FIG. 1, is in turn riveted to supporting member 2, supporting member 2 having extensions 7 and 8 suitable for this purpose.

FIG. 2 shows an alternate embodiment. In FIG. 2, electrode 3 is a single part, namely a flat spring 9 preferably made of bronze whose free end 10 is bent and formed into a tip 10 suitable for recording purposes. The flat spring 9 is fastened to supporting member 2 by means of flaps 11 and 12 which are part of flat spring 9.

FIG. 3 shows a further preferred embodiment of the recording element 1. Here too, the electrode 3 is constructed as a single unit from wire material. Specifically, one end 13 of electrode 3 is coiled in such a manner that it may be pushed onto supporting member 2 and, for better contact, is soldered or pressed against said supporting member. The other end 14 of the electrode forms the stylus or recording tip and abuts against supporting member 2 with a certain initial tension. In FIG. 3 the record carrier is indicated by reference numeral 15 and is to be transported in the direction of the arrow. In this embodiment it is important that electrode 3 has good elastic properties in the direction perpendicular to the plane of the record carrier, while a sufficient stiffness in the direction perpendicular to the direction of transport of the record carrer, that is in the recording direction, is required. The latter is required so that when the supporting member 2 returns to its initial position following the recording, electrode 3 will follow. In a further preferred embodiment of the present invention the supporting member 2 has a slot or a bore in one end for receiving the end 14 of electrode 3. The supporting member 2 is the same for all three embodiments. In a preferred embodiment it is formed as an L-shaped stamped metal part. It has a leg 16, herein referred to as a second leg, to which the electrode is fastened and which is pivoted when the recording element is pivoted. The other leg 17, herein referred to as a first leg, has a portion 19 and 20 separated by a recess 18. An extension of leg 17 is formed to constitute a plug 21 which serves to connect the recording element 1 with the current source. It is denoted that a precision stamping procedure is used in manufacturing the supporting member 2, particularly so that the portions 19 and 20 can be formed with great accuracy which is required as will be explained below.

FIG. 4 shows a plurality of recording elements 1 which corresponds to the number of tracks in the record carrier and which are mounted in a mounting means 22. The mounting means are made of electrically insulating material. FIG. 4 is presented mainly to give a good overall idea of the present invention, while details will be discussed with reference to FIG. 5.

Figure 6:
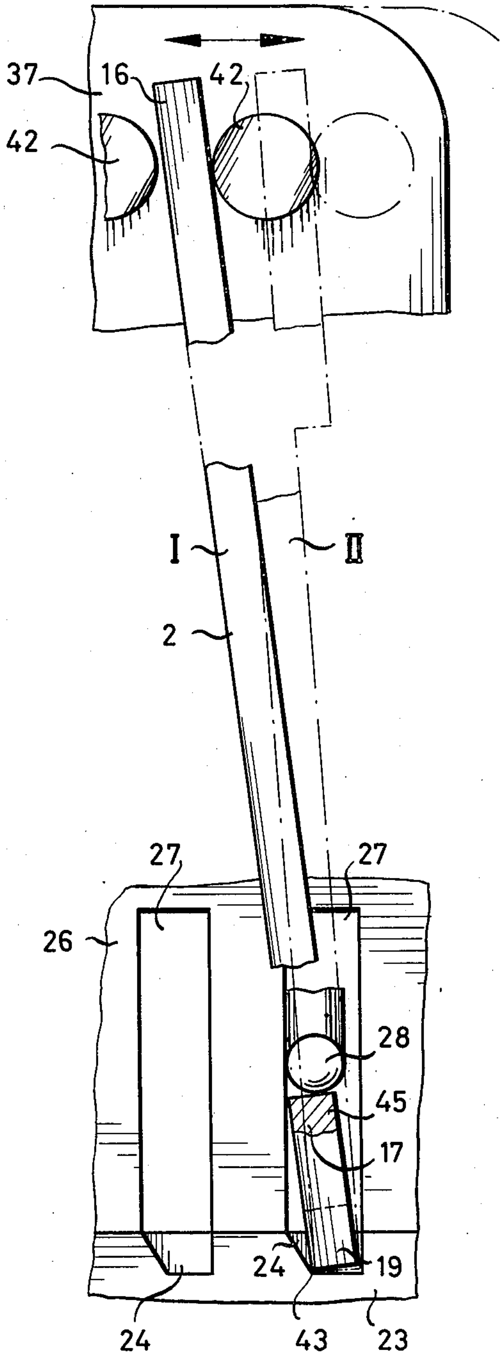
FIG. 6 is a representation of the extreme positions of the recording elements.

Mounting means 22, in a preferred embodiment, are injection molded as a single unit out of plastic. They comprise a plurality of recesses, and more specifically a plurality of pairs of recesses, each pair comprising a recess 24 and a recess 25. Portions 19 and 20 of the supporting member are mounted in these recesses. Further, the dimensions are such that very little play exists in the direction of leg 17. The portion of the mounting means including the recesses are herein referred to as the base or first portion. Arranged perpendicular to the first portion is a wall or second portion which has a plurality of through-openings 27. The plurality of through-openings 27 corresponds in number to the plurality of recording elements 1. Specifically, the leg 17 of a supporting member 2 of each of the electrodes extends through the through-opening of a corresponding one of the openings 27. A leg 28 of a substantially U-shaped spring 29 also extends into the through-opening 27, while the other leg 30 of spring 29 extends into a further through-opening 31 of wall portion 26. In a preferred embodiment of the present invention the through-openings 31 and 27 are in the same plane. For lateral support and for mutual electrical isolation of the springs 29 each associated with one of the recording elements 1, the mounting means 22 have a rake-shaped portion 32 having suitable slits 33. The mounting means thus hold springs 29 under tension and one leg, leg 28 of each of said springs, acts upon the supporting member 2 and holds the recording element 1 in its proper position in the mounting means 22. As previously mentioned, and as shown in FIG. 6, leg 17 of the supporting member 2 has sufficient lateral play for its required movement during the pivoting of the recording element. However, leg 28 of spring 29 either enters into the through opening 27 substantially without play which causes a certain amount of friction to be generated upon pivoting of the recording element 1 or, alternatively, there is sufficient difference between the diameter of leg 28 of spring 29 and the through-opening 27 that leg 28 can follow the movement of leg 17 without friction. In order to achieve greater accuracies, it is advantageous that the spring 29 have a rectangular cross-section. In a further preferred embodiment, all recording elements could be acted upon by a single spring unit which then of course would have to be manufactured from electrically insulating material. For completeness sake it should also be mentioned that a projection 34 of the mounting means 22 has bores 35 and 36 which allow the mounting of the recording system in a suitable housing.

The pivoting of the recording elements 1 is initiated by a driving means 37 which is coupled to the recording elements. Driving means 37, here only symbolically indicated by a peg-slot drive 38, 39 are mounted for oscillation and are activated by an eccentric 40 which is arranged on a motor-driven shaft 41. Coupling means coupling the recording elements 1 to the driving means comprise plugs 42 formed on the driving means 37, the plugs acting upon the legs 16 of the supporting members 2 when the recording elements 1 are mounted in the mounting means 22. In a further embodiment, a change in the length of the recorded marking or mark can be simply achieved by moving the mounting means 22 relative to the driving means 37. Suitable adjustment means for this purpose may be provided on the recording system.

A particular characteristic of the present invention which is readily understandable with reference to FIG. 6 is the relative placement of the driving means 37 and mounting means 22 in the direction of the recording elements which are arranged side-by-side. In this arrangement the movement of the driving means 37 oscillates from an extreme position denoted by I to a second extreme position denoted by II. During the movement, which is determined by eccentric 40, the recording element is pivoted about the edges 43 and 44 of portions 19 and 20 of the supporting member 2, which as previously mentioned, are mounted in recesses in the mounting means 22. In this case, the edges 43 and 44 constitute the edges, while the recesses 24 and 25 constitute the seat of a double-knife edge bearing. The recesses 24 and 25 have a trapezoidal cross-section in the direction in which the recording elements 1 extend. This shape allows a pivoting of the record elements 1. Alternatively, the base surface of the recesses 24 and 25 may be slightly inclined relative to the top surface of the base portion of the mounting means. Further, the point 45 at which the leg 28 of spring 29 acts on leg 17 of the supporting member 2 is important. Because of the slanted position of the recording element 1, a point component is effective through a lever arm onto the bearing surface of the supporting member 2 which causes a steady turning moment to be exerted onto the supporting member 2. This causes the position of the supporting member 2 in recesses 24 and 25 to be maintained. Further, by suitable dimensioning, a restoring effect can be generated which causes the leg 16 of supporting member 2 to press against the same plug 42 during the whole phase of motion of the driving means 37, that is the motion of the recording element 1 takes place without play. It should also be mentioned that the slightly arced form of the markings which result from this somewhat diagonal positioning of the recording element does not have any adverse affects and, if necessary, can be compensated for by adjusting the direction of transport of the record carrier.

It is a particular advantage of the present invention that the particular type of mounting utilized results in a particularly frictionless and therefore free mounting of the recording elements which, in turn, allows a high frequency of operation and therefore a high recording speed. The particular construction of the recording element causes the actual motion of the electrodes to be decoupled from the supporting forces of the recording elements and from the driving forces which initiate the pivoting, so that a high quality of recording results. Thus the cost of the system of the present invention is relatively low, while the recording elements are still manufactured with a relatively high accuracy. The system is thus readily reproducible. Further, the various recording elements may be readily interchanged and the elements mounted in the mounting means without tools.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Recording system, comprising, in combination, a record carrier for receiving markings; transport means for transporting said record carrier along a predetermined path; a plurality of recording elements each comprising an electrically conductive rigid supporting member having connecting means for receiving electrical energy; an electrode spring-mounted on said supporting member; electrically insulating mounting means for pivotally mounting said recording elements side-by-side along said path and in a direction perpendicular thereto; oscillating drive means; and coupling means for coupling said oscillating drive means to said recording elements for pivoting said pivotally mounted recording elements about a pivot axis.

2. A recording system as set forth in claim 1, wherein each of said supporting members has a first leg extending in the direction of said pivot axis, said first leg accommodating said connecting means.

3. A recording system as set forth in claim 1, wherein each of said supporting members has a first leg extending in the direction of said pivot axis and a second leg extending substantially perpendicularly to said first leg; wherein said electrode is mounted on said second leg; wherein said coupling means couple said oscillating drive means to said second leg; wherein said first leg has a first and second lower edge and a recess separating said first and second lower edge, said first and said second edges constituting bearing edges; wherein said mounting means has a plurality of recesses for receiving said bearing edges; further comprising spring means mounted on said mounting means for acting on said supporting member in such a manner that said bearing edges are braced against the bottom portion of said recesses.

4. A recording system as set forth in claim 3, wherein each of said recesses in said mounting means has a substantially trapezoidal shape for receiving said bearing edges.

5. A recording system as set forth in claim 4, wherein said plurality of recesses comprises a plurality of pairs of recesses, each pair for receiving the bearing edges of one of said supporting members, each recess in one of said pairs of recesses being spaced from the other by a distance sufficient to prevent play in the direction of said first leg of said supporting member.

6. A recording system as set forth in claim 3, wherein said mounting means comprises a base portion having said recesses and a wall extending in a direction perpendicular to said recesses, said wall having a plurality of through-openings, one for accommodating each of said first legs of said supporting members, each of said through-openings having sufficient widths for accommodating the pivoting of said supporting member.

7. A recording system as set forth in claim 6, wherein each of said spring means has at least one portion extending into a corresponding one of said through-openings; and wherein said drive means is coupled to said second leg in such a manner that said spring means exerts a turning moment about said pivot axis on said recording element in each pivoting position thereof.

8. A recording system as set forth in claim 7, wherein each of said spring means comprises a substantially U-shaped spring having a rectangular cross-section.

9. A recording system as set forth in claim 1, wherein each of said supporting members is an L-shaped stamped metal part.

10. A recording system as set forth in claim 1, wherein each of said electrodes has a tip; and wherein said means for spring mounting each of said electrodes on the corresponding one of said supporting members comprises a flat spring riveted to said supporting member.

11. A recording system as set forth in claim 10, wherein said flat spring has at least one flange; further comprising means for clamping said flange to said supporting member.

12. A recording system as set forth in claim 1, wherein said electrode comprises a flat spring having a free end; and wherein said free end is bent at an angle from the remainder of said electrode and sharpened.

13. A recording system as set forth in claim 12, wherein said flat spring constituting said electrode has a flange; further comprising means for clamping said flange to said supporting member.

14. A recording system as set forth in claim 1, wherein each of said electrodes comprises a wire having a coiled end for mounting on said supporting member; wherein said supporting member has a hole; and wherein said wire has a second end passing through said hole.

15. A recording system as set forth in claim 1, wherein said mounting means comprise a comb-like structure for accommodating all of said recording elements.

* * * * *